J. M. MOORE.
Harvester-Reel.

No. 225,854. Patented Mar. 23, 1880.

UNITED STATES PATENT OFFICE.

JOSEPH M. MOORE, OF OVILLA, TEXAS.

HARVESTER-REEL.

SPECIFICATION forming part of Letters Patent No. 225,854, dated March 23, 1880.

Application filed January 15, 1880.

*To all whom it may concern:*

Be it known that I, JOSEPH M. MOORE, of Ovilla, in the county of Ellis and State of Texas, have invented certain new and useful Improvements in Harvester-Reels; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to harvester-reels; and it consists in placing around the reel a covering of canvas, cloth, or other suitable material, as hereinafter more fully set forth.

Figure 1:
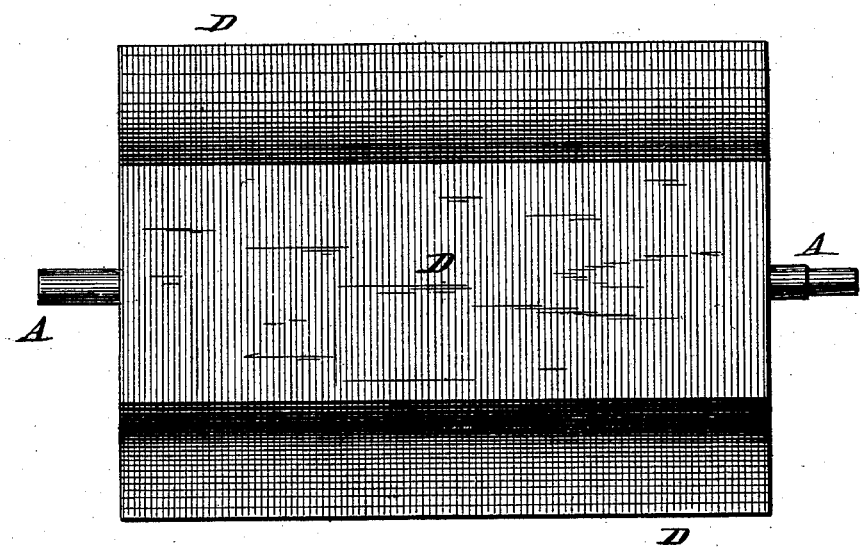
Figure 2:
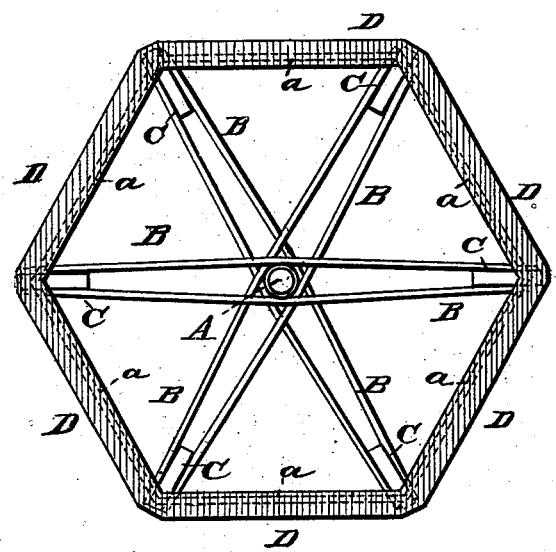

In the annexed drawings, Figure 1 is a side elevation, and Fig. 2 is an end view.

In the drawings, A indicates the shaft; B, the arms, and C the blades, of an ordinary six-bladed reel.

D indicates a canvas covering, and *a* an end draw-cord.

The reel is constructed in any of the ordinary forms, and one with six blades, as shown, is preferred; but my invention may be applied to reels having four or a greater number than six.

In order to cover the reel, I take a piece of canvas or a lighter cloth and form it of a width a little wider than the length of the reel, so that it may be drawn over the reel ends, as shown in Fig. 2, and contracted by a draw-cord (shown by the dotted lines *a*) or otherwise, so as to form a lock or stop to prevent any end movement, without tacking or otherwise fastening the cloth to the blades.

Between the ends the edges are brought together and held by one or more straps and buckles. This gives the canvas the necessary strain in both directions to hold it in place and to make it effective in use.

I have found this addition to a reel to be a decided improvement, especially in short grain and useful in long.

The advantages which I have found in actual practice are, that it prevents the reel-blades from striking the grain with blows; that it gives all of the grain a nearly equal incline toward the sickle; that it makes the cutting by the sickle more uniform; that in grain-harvesters having platforms or grain-carriers it delivers the grain more evenly and uniformly upon them; that it prevents the reel from throwing or knocking grain over behind the carrier and from catching or winding on the reel.

Having thus fully described my invention, what I claim as new, and desire to secure by Letters Patent, is—

A harvester-reel having the arms B C, in combination with a covering, D, substantially as and for the purpose set forth.

In testimony that I claim the foregoing as my own I have hereto affixed my signature in presence of two witnesses.

JOSEPH MARTIAL MOORE.

Witnesses:
JAMES B. SIMPSON,
C. M. WELLBORN.